Figure 1:
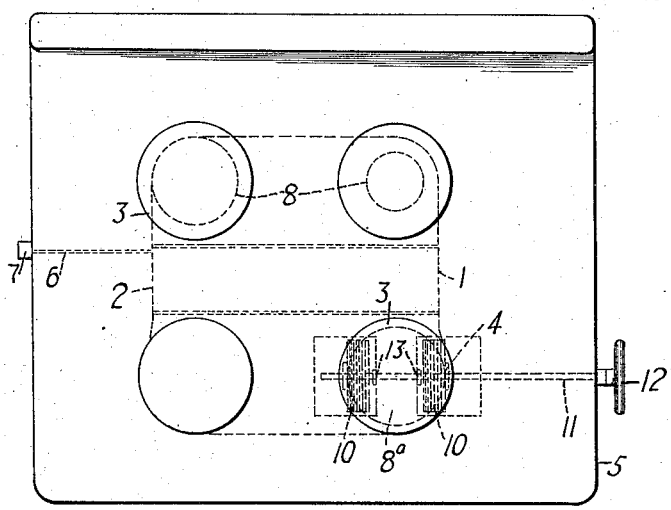

T. HOOCK.
ELECTRICALLY HEATED APPARATUS.
APPLICATION FILED OCT. 23, 1912.

1,146,623.

Patented July 13, 1915.
2 SHEETS—SHEET 1.

WITNESSES:

INVENTOR
Theodor Hoock
BY
ATTORNEY

T. HOOCK.
ELECTRICALLY HEATED APPARATUS.
APPLICATION FILED OCT. 23, 1912.
1,146,623.
Patented July 13, 1915.
2 SHEETS—SHEET 2.
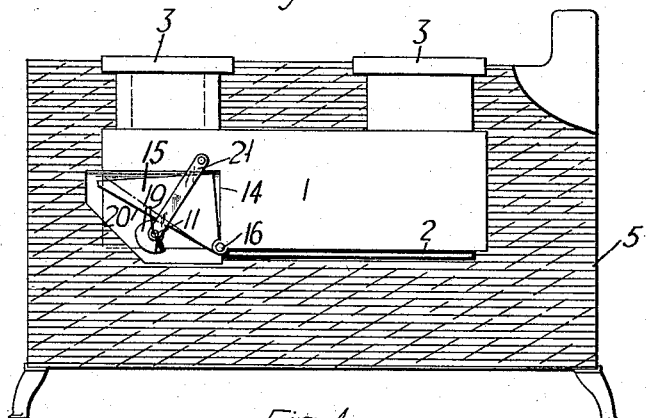
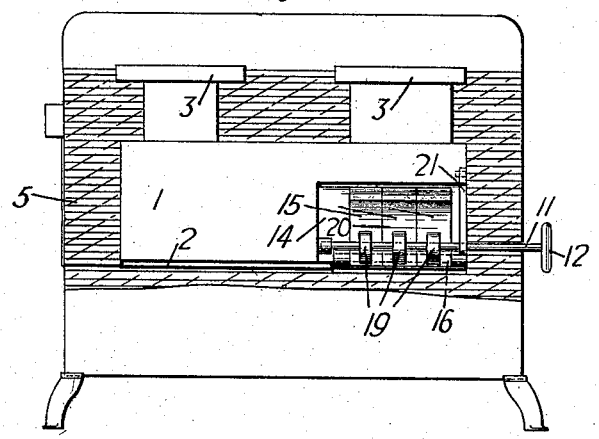
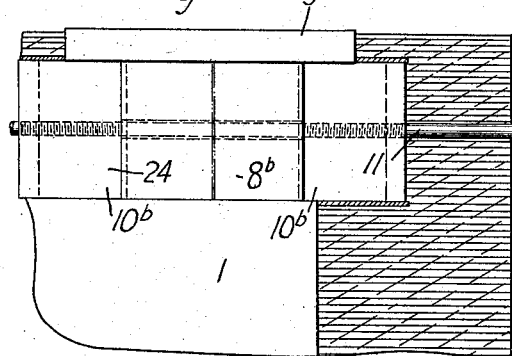
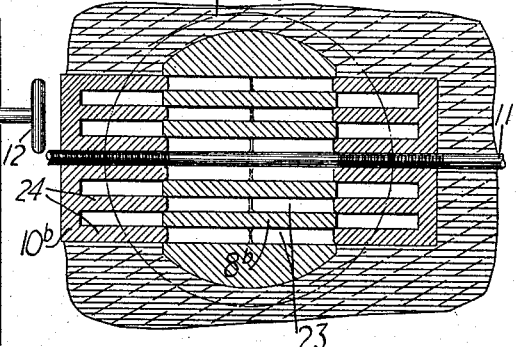
WITNESSES:
INVENTOR
Theodor Hoock
BY
ATTORNEY

UNITED STATES PATENT OFFICE.

THEODORE HOOCK, OF COLOGNE, BAYENTHAL, GERMANY, ASSIGNOR TO WESTINGHOUSE ELECTRIC AND MANUFACTURING COMPANY, A CORPORATION OF PENNSYLVANIA.

ELECTRICALLY-HEATED APPARATUS.

1,146,623.      Specification of Letters Patent.      Patented July 13, 1915.

Application filed October 23, 1912. Serial No. 727,295.

*To all whom it may concern:*

Be it known that I, THEODORE HOOCK, a subject of the Emperor of Germany, and a resident of Cologne, Bayenthal, Germany, have invented a new and useful Improvement in Electrically-Heated Apparatus, of which the following is a specification.

My invention relates to electrically heated apparatus, and it has special reference to stoves and ranges of the so-called "heat-storage" type which embody a mass of heat-storage material that is provided with an electric heater which is supplied with electrical energy at a low and substantially constant rate, whereby heat is accumulated or stored in the heat storage mass and may be utilized for cooking operations at any desired rate.

One of the objects of my invention is to provide a device of the above-indicated character which shall be simple and durable in construction, efficient in operation, and may be utilized for a variety of cooking operations.

Another object of my invention is to provide a heat-storage range or stove of the class referred to that is so constructed as to permit various parts thereof to be maintained at approximate predetermined temperatures in order to accommodate a variety of cooking operations which require different intensities of heat.

Another object of my invention is to provide ready mechanical means whereby the temperature of a portion of the heat-storage mass, forming a part of the range, may be regulated as desired without, in any way, affecting the electrical input to the apparatus.

It is well known in the art that material economies may be effected in the cost of cooking operations, by means of electrical stoves or ranges of the heat-storage type, for the reason that very low rates may be secured from electric power companies on account of the constant nature of the load. In certain classes of service, such as in hotels or restaurants, where a variety of cooking operations requiring different temperatures are performed at the same time, it is evident that some means must be provided for maintaining various portions of the range at different temperatures without effecting the energy input to the apparatus in order to secure the benefit of the reduced cost of power. It is also desirable to be able to regulate the temperature of a portion of the apparatus to any desired value, independently of any electrical adjustments which would affect the constant input.

In accordance with my invention, I provide a heat-storage range having a plurality of "hot plates" which are so proportioned and related with respect to the main heat-storage body that the temperatures thereof are maintained at approximate predetermined values. Moreover, I provide mechanical means which may be readily adjusted for regulating the temperature of a portion of the heat-storage body.

Figure 2:
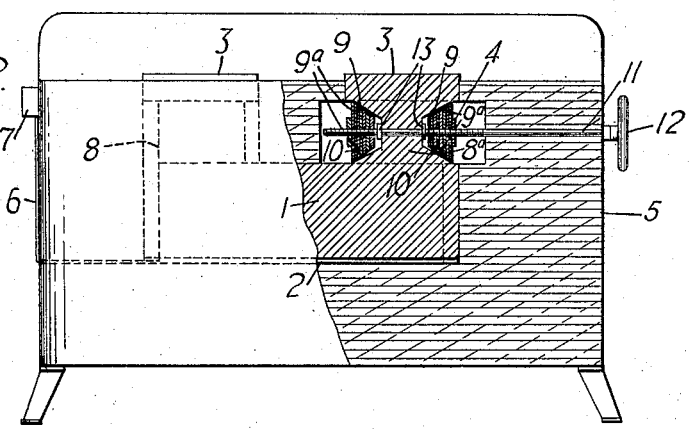

In the accompanying drawing, Figure 1 is a plan view of a device constructed in accordance with my invention. Fig. 2 is a view, partially in section and partially in side elevation, of the device shown in Fig. 1. Figs. 3 and 4 are sectional views, respectively partially in side elevation and partially in front elevation, of a modified form of my invention, and Figs. 5 and 6 are enlarged sectional views, respectively partially in side elevation and partially in plan, of a further modification embodying my invention.

Referring, particularly, to Figs. 1 and 2, the apparatus here shown comprises a heat-storage mass or body 1, an electric heating device 2, a plurality of hot plates 3, adjustable mechanical means 4 for a purpose to be hereinafter set forth, and heat-insulating material 5 enveloping said parts.

The heat-storage body 1 may conveniently be made of cast iron or some other material which is particularly adapted to store and accumulate heat, and the hot plates 3 may be integrally associated therewith and of a similar material.

The heating device 2 preferably comprises an electric heater of any well known construction, and, inasmuch as the structural details thereof form no material part of my present invention, no description thereof will be given. The heater 2 is disposed in intimate contact with the bottom of the heat-storage body 1 and is provided with a plurality of leads 6 which terminate in a terminal box 7 for purposes of connection with an exterior source of energy (not shown).

The several hot-plates 3 are provided with intermediate portions or necks 8 of different cross sectional areas in order that the several hot plates may be maintained at different temperatures, it being understood that the hot plate 3 having a neck portion 8 of the largest cross sectional area will be maintained at the highest temperature, since the amount of heat supplied to the hot plates varies in direct proportion to the cross-sectional area of the heat-conducting material which is interposed between its working surface and the heat-storage body 1. Obviously, the hot plate having the smallest neck or connecting portion will be maintained at the lowesst temperature by reason of its relatively low heat conductivity. Manifestly, by properly choosing the proportions of the various hot plates, any desired temperatures thereof may be obtained.

The hot plate 3 that is provided with the adjustable mechanical means 4 for regulating its temperature is provided with a connecting or neck portion $8^a$ having recesses on the respective sides thereof that are provided with inclined surfaces 9, for a purpose to be set forth. Disposed on the respective sides of said neck portion $8^a$ and in coöperative relation with the inclined surfaces 9, are a plurality of movable heat-conducting or heat-storage members 10 which are associated with the shaft 11 that projects through the neck portion $8^a$ and the outer end of which is provided with a hand wheel or similar device 12. The bodies 10 preferably comprise a plurality of closely assembled flexible members of suitable heat-conducting or heat-storage material, although solid masses of suitable material may be employed. The upper and lower edges $9^a$ of the bodies 10 are inclined to coöperate with the inclined edges 9 of the hot plate 3, but the angle thereof is somewhat greater, whereby a greater variation in contact area and pressure between the bodies 10 and the connecting portion $8^a$ may be secured. Collars 13 are rigidly associated with the shaft 11 on the respective sides of the neck portion $8^a$ in order to prevent longitudinal movement of said shaft. The shaft 11 is oppositely threaded adjacent to the collars 13 for coöperative engagement with the members 10, whereby said members are actuated concurrently in opposite directions when the hand wheel 12 is turned.

The upper surfaces of the several hot plates 3 may be covered by suitable heat-insulating members or pads (not shown) when not in use. The remaining portions of the hot plates and of the heat-storage body 1 and electric heater 2 are enveloped in the heat-insulating material 5 in order to prevent loss of heat by radiation.

As shown in Fig. 2, the surfaces $9^a$ of the several movable members 10 are in contact with the inclined edges 9 of the neck portion $8^a$ at their outer ends. It is evident, therefore, that by reason of the position of the members 10, a considerable amount of heat may flow freely through them to the working surface of the hot plate 3. If the hand wheel 12 be moved so as to bring the remaining portions of the surfaces $9^a$ of the members 10 into intimate contact with the surfaces 9 of the neck portion $8^a$ and to increase the pressure between said parts, it is evident that increased conductivity is secured and, hence, that the hot plate may be maintained at a higher temperature. If it is desired to lower the temperature of the hot plate, the hand wheel 12 may be turned in the opposite direction, thereby causing the surfaces $9^a$ of the members 10 to be with- the neck portion $8^a$, thereby reducing the flow of heat and conductivity of the neck portion $8^a$ and thus lowering the temperature of hot plate 3. By thus adjusting the positions of the members 10 with respect to the connecting portion $8^a$, any desired temperature may be secured.

Referring now to Figs. 3 and 4, the heat-storage body 1 is provided with an electric heater 2 and with a plurality of hot-plates 3, said parts being surrounded by insulating material 5 in the manner set forth with respect to Figs. 1 and 2. Directly beneath one of the hot plates 3, the heat-storage body 1 is provided with a recess 14 in which are disposed a plurality of movable members 15 of heat-conducting and heat-storage material. The members 15 are substantially triangular in shape and are pivotally supported at one corner upon a shaft 16. A slight distance below the movable members 15, a shaft 11, having a handle 12 at its outer end, is disposed, and said shaft is provided with a plurality of cams 19 which are rigidly secured thereto and are severally adapted to coöperate with the lower surfaces 20 of the movable members 15. The cam members 19 are of like construction and the contour thereof is so chosen that the movable members 15 are raised into intimate contact with the heat-storage body 1 by the rotative movement of said cams. Moreover, the cam members 19 are disposed at different angles upon the shaft 11 in order that the several movable members 15 may be actuated successively. One end of a link member 21 surrounds the shaft 11 while the other end thereof is secured to the heat-storage body 1 in order to lend strength and rigidity to the shaft 11 when considerable force is exerted thereon.

Assuming the various parts to occupy the positions shown in Figs. 3 and 4, the hot plate 3 directly above the members 15 is maintained at its lowest temperature by reason of the small amount of material interposed between it and the main portion of the heat-storage body 1. In order to increase the temperature of the hot plate referred to, the handle 12 may be turned whereby the movable members 15 are sucessively brought into intimate contact with the heat-storage body 1, thus increasing the active cross-sectional area of conducting material between the body 1 and the hot plate 3. Any intermediate temperature, of course, may be secured by suitable adjustment of the movable members 15 by means of the hand wheel 12.

Reference may now be had to Figs. 5 and 6 in which the hot plate 3 is associated with the heat-storage body 1 by means of a neck or connecting portion $8^b$ which is provided with a plurality of parallel slots or openings 23. The opposite sides of the neck portion $8^b$ are parallel, the one to the other, and in coöperative relation therewith are a plurality of movable members $10^b$ of heat-conducting material which are provided with a plurality of arms 24, the latter being adapted to be inserted into the openings 23 by means of a shaft 11 and hand wheel 12 in the manner hereinbefore described. As shown in the figures, the movable members $10^b$ are in their outer positions and, inasmuch as the smallest amount of active heat-conducting material is interposed between the working surface of the hot plate 3 and the heat-storage body 1, said hot plate is maintained at its lowest temperature. By means of the handle 12, the members $10^b$ may be concurrently actuated, whereby the arms 24 are inserted into the openings 23 to increase the conductivity of the neck portion $8^b$ and thus secure higher temperatures.

Various modifications may be effected in the structural details and arrangement and location of parts, and, as such changes may secure the benefits and advantages of my invention to a greater or less extent without departing from its spirit and scope, I intend to cover them in the appended claims.

I claim as my invention:

1. A heating device comprising a heat-storage body having a plurality of integrally associated projecting arms of different cross sectional areas, means for supplying heat to said body, and heat-insulating walls surrounding said parts.

2. A heating device comprising a heat-storage body having integrally associated projecting members of different cross sectional areas, an electric heater for supplying heat to said body and means for preventing free radiation of heat from said body.

3. A heating device comprising a heat-storage body, means for supplying heat thereto, and walls of heat-insulating material enveloping said parts, said body being provided with a plurality of integrally associated projecting members having predetermined relationship with said body whereby said members are normally maintained at approximate predetermined temperatures.

4. In a heating device, the combination with a heat-storage body, an electric heater therefor and heat-insulating material enveloping said parts, of auxiliary heat-storage members integrally associated with said body, said members being related and proportioned with respect to said body to maintain said bodies at approximate predetermined temperatures under normal conditions.

5. A heating device comprising a heat-storage body, a heater unit therefor, mechanical means for regulating the distribution of heat to portions of said body, and heat-insulating material enveloping said parts.

6. A heating device comprising a heat-storage body, means for electrically heating the same, adjustable mechanical means for regulating the temperature of a portion of said body, and walls of heat-insulating material surrounding said parts.

7. A heating device comprising a heat-storage body, an electric heater therefor, an active heating member of heat-storage material associated with the said body, adjustable means for regulating the cross-sectional area of the said active heat-storage member, and walls of heat-insulating material enveloping said parts.

8. A heating device comprising a heat-storage body, an electric heater therefor, auxiliary heat-storage members adapted to be associated with said body, adjustable means for varying the effective cross-sectional area of said members, and heat-insulating material surrounding said parts.

9. A heating device comprising a heat-storage body having an integrally associated projecting portion, an electric heater for said body, mechanical means for regulating the amount of active heat-storage material associated with said projecting portion, and walls of heat-insulating material enveloping said parts.

10. A heating device comprising a heat-storage body having an integrally associated projecting portion, an electric heater for said body, mechanical means for regulating the heat conductivity of said projecting portion, and walls of heat-insulating material enveloping said parts.

11. A heating device comprising a heat-storage body, an electric heater therefor, movable auxiliary means for regulating the heat conductivity of a relatively stationary portion of said body, and heat-insulating material surrounding said parts.

12. In a heating device, the combination with a heat-storage body having an integral projecting member associated therewith, of auxiliary heat-conducting members disposed on the respective sides of said projecting member, mechanical means for adjusting the position of said auxiliary members with respect to said projecting member, and heat-insulating walls enveloping said parts.

13. In a heating device, the combination with a heat-storage body embodying an integrally associated projecting portion having inclined recesses in the respective sides thereof, auxiliary members of relatively flexible heat-conducting material disposed adjacent to the recesses of said projecting portion, of mechanical means for concurrently advancing said auxiliary members into said recesses and for maintaining a pressure between said auxiliary members and said heat-storage body, and walls of heat-insulating material enveloping said parts.

14. In a heating device, the combination with a heat-storage body, an electric heater therefor, and auxiliary flexible members of heat-conducting material, of mechanical means for associating a plurality of said members with said heat-storage body, whereby changes in the distribution of heat in said body are effected, and walls of heat-insulating material surrounding said parts.

In testimony whereof, I have hereunto subscribed my name this 5th day of August 1912.

THEODORE HOOCK.

Witnesses:
Louis Vandory,
Bessie F. Dunlap.

Copies of this patent may be obtained for five cents each, by addressing the "Commissioner of Patents, Washington, D. C."